US009854008B2

(12) United States Patent
Fan et al.

(10) Patent No.: US 9,854,008 B2
(45) Date of Patent: Dec. 26, 2017

(54) REAL TIME COMMUNICATION METHOD, TERMINAL DEVICE, REAL TIME COMMUNICATION SERVER AND REAL TIME COMMUNICATION SYSTEM

(71) Applicant: Huawei Device (Dongguan) Co., Ltd., Dongguan (CN)

(72) Inventors: Shunan Fan, Beijing (CN); Wenmei Gao, Beijing (CN); Xiaoqiang Lv, Beijing (CN); Yahui Wang, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 360 days.

(21) Appl. No.: 14/576,037

(22) Filed: Dec. 18, 2014

(65) Prior Publication Data

US 2015/0106438 A1    Apr. 16, 2015

Related U.S. Application Data

(63) Continuation of application No. PCT/CN2013/080406, filed on Jul. 30, 2013.

(30) Foreign Application Priority Data

Jul. 30, 2012  (CN) .......................... 2012 1 0266735

(51) Int. Cl.
*H04L 12/18* (2006.01)
*H04L 12/24* (2006.01)
(Continued)

(52) U.S. Cl.
CPC ...... *H04L 65/1073* (2013.01); *H04L 12/1818* (2013.01); *H04L 51/00* (2013.01); *H04L 51/04* (2013.01); *H04L 65/1059* (2013.01)

(58) Field of Classification Search
USPC ....... 709/203, 224, 222, 229, 227, 228, 206, 709/207
See application file for complete search history.

(56) References Cited

U.S. PATENT DOCUMENTS 6,650,619 B1 * 11/2003 Schuster .............. H04Q 3/0025
                                                                370/230
7,325,029 B1 *  1/2008 Chang .................... G06Q 30/02
                                                                370/352
(Continued)

FOREIGN PATENT DOCUMENTS

CN    101102287 A    1/2008
CN    101119327 A    2/2008
(Continued)

OTHER PUBLICATIONS

Uberti, J., et al., "Javascript Session Establishment Protocol; draft-uberti-rtcweb-msep02.txt," Internet Engineering Task Force, IETF; Standard Working Draft, Internet Society (ISOC), Feb. 16, 2012, 28 pages.

*Primary Examiner* — Jude Jean Gilles
(74) *Attorney, Agent, or Firm* — Slater Matsil, LLP

(57) ABSTRACT

The present invention provides a real time communication method, a terminal device, an RTC server and an RTC system. The method includes: receiving, by a first terminal, call request information that is sent by another terminal to the first terminal and forwarded by an RTC server and, where the call request information carries a unique identifier of a WEB-based RTC application of a terminal sending the call request information; and determining, by the first terminal, whether to accept a call request according to the unique identifier of the WEB RTC of the terminal sending the call request information, if yes, sending request information for opening the WEB-based RTC application to the RTC server, and after receiving information of the WEB-
(Continued)

based RTC application returned by the RTC server, communicating, by using the WEB-based RTC application, with the terminal sending the call request information.

20 Claims, 6 Drawing Sheets

(51) Int. Cl.
*H04L 29/06* (2006.01)
*H04L 12/58* (2006.01)

(56) References Cited

U.S. PATENT DOCUMENTS

| | | | | |
|---|---|---|---|---|
| 7,603,403 | B2* | 10/2009 | Banerjee | H04L 29/06 709/201 |
| 8,473,626 | B2* | 6/2013 | Defayet | H04L 67/14 709/227 |
| 9,014,197 | B2* | 4/2015 | Nambakkam | H04M 7/0075 370/352 |
| 2004/0244010 | A1* | 12/2004 | Kleyman | H04L 29/06027 719/318 |
| 2005/0141694 | A1* | 6/2005 | Wengrovitz | H04M 3/5191 379/265.09 |
| 2007/0067451 | A1* | 3/2007 | Oshiba | H04L 12/2602 709/224 |
| 2007/0161386 | A1 | 7/2007 | Faber et al. | |
| 2007/0248011 | A1* | 10/2007 | Ohno | H04L 12/14 370/230 |
| 2008/0155104 | A1 | 6/2008 | Quinn et al. | |
| 2012/0066722 | A1* | 3/2012 | Cheung | H04M 1/7253 725/62 |

FOREIGN PATENT DOCUMENTS

| | | |
|---|---|---|
| CN | 102075455 A | 5/2011 |
| CN | 102130844 A | 7/2011 |
| CN | 102316146 A | 1/2012 |

* cited by examiner

REAL TIME COMMUNICATION METHOD, TERMINAL DEVICE, REAL TIME COMMUNICATION SERVER AND REAL TIME COMMUNICATION SYSTEM

This application is a continuation of International Application No. PCT/CN2013/080406, filed on Jul. 30, 2013, which claims priority to Chinese Patent Application No. 201210266735.X, filed on Jul. 30, 2012, both of which are hereby incorporated by reference in their entireties.

TECHNICAL FIELD

The present invention relates to the field of communications technologies, and in particular, to a real time communication method, a terminal device, a real time communication server and a real time communication system.

BACKGROUND

For a conventional Web (WEB)-based real time communication service, an additional plug-in needs to be downloaded and installed. The real time communication service is implemented by using the installed plug-in, such as QQ and MSN.

However, in existing WEB-based real time communication (Real Time Communication, RTC), an API between a WEB application and a browser is defined so that a WEB-based RTC application can run in the browser, thereby implementing end-to-end transmission of a message, audio, a video, and the like. For example, when a first user visits, by using a browser, a website providing a WEB RTC service, this website returns a page of the WEB-based RTC application to a terminal of the first user, that is, the WEB-based RTC application, such as WEB QQ, is opened. A second user also opens the WEB-based RTC application in a same manner, and then a connection can be established between the first user and the second user for mutual communication. When a user closes the web page or the browser, the communication is also ended or a communication connection request cannot be received.

The existing WEB-based real time communication requires that two parties in communication are simultaneously online and open the WEB-based RTC application. For example, when the real time communication is implemented by using the browser, and one party in communication does not open the browser, or opens the browser but does not log in to the website providing the WEB RTC service, that is, does not open the WEB-based RTC application, information sent by the other party cannot be acquired.

SUMMARY

An embodiment of the present invention provides a real time communication method, so as to solve a problem that information cannot be acquired when two parties in communication are not simultaneously online or a WEB-based RTC application is not opened in existing WEB-based real time communication.

According to a first aspect, a real time communication method is provided, where the method includes:

receiving, by a first terminal, call request information that is sent by another terminal to the first terminal and forwarded by a real time communication (RTC) server, where the call request information carries a unique identifier of a WEB-based RTC application of the terminal sending the call request information; and determining, by the first terminal according to the unique identifier of the WEB-based RTC application of the terminal sending the call request information, whether to accept a call request, and if it is determined that the call request needs to be accepted, sending request information for opening the WEB-based RTC application to the RTC server, and after receiving information of the WEB-based RTC application returned by the RTC server, communicating, by using the WEB-based RTC application, with the terminal sending the call request information.

In a first possible implementation manner of the first aspect, before the receiving, by a first terminal, call request information that is sent by another terminal to the first terminal and forwarded by an RTC server, the method further includes:

sending, by the first terminal to the real time communication (RTC) server, request information for registering an offline service, where the information carries a unique identifier of a WEB-based RTC application, so that after receiving the request information for registering an offline service, the RTC server enables an offline mode for the WEB-based RTC application corresponding to the unique identifier, and feeds back success response information to the first terminal; and closing, by the first terminal, the WEB-based RTC application after receiving the success response information fed back by the RTC server.

With reference to the first aspect or the first possible implementation manner of the first aspect, in a second possible implementation manner, the request information for opening the WEB-based RTC application further carries a type of a WEB-based RTC application selected by a user, so that after receiving the request information for opening the WEB-based RTC application, the RTC server returns a WEB-based RTC application with a same type as the WEB-based RTC application.

In a third possible implementation manner of the first aspect, the call request information further carries identification information of a browser engine of the terminal sending the call request information;

the receiving, by the first terminal, call request information sent by the RTC server includes:

parsing, by a monitoring client of the first terminal, the call request information after receiving the call request information sent by the RTC server, determining, according to the identification information of the browser engine in the call request information, that the call request information is information sent to the browser engine, and sending the call request information to the browser engine of the first terminal.

With reference to the first aspect or the first possible implementation manner of the first aspect or the second possible implementation manner of the first aspect or the third possible implementation manner of the first aspect, in a fourth possible implementation manner, the call request information further carries Session Description Protocol Offer SDP Offer information for session negotiation;

the sending, by the first terminal, request information for opening the WEB-based RTC application to the RTC server, and after receiving information of the WEB-based RTC application returned by the RTC server, communicating, by using the WEB-based RTC application, with the terminal sending the call request information specifically includes:

sending, by the first terminal, the request information for opening the WEB-based RTC application to the RTC server through the browser engine, and after receiving the information of the WEB-based RTC application returned by the RTC server, sending the SDP Offer information in the call request information to the WEB-based RTC application, generating SDP Answer information according to the SDP Offer information by using the WEB-based RTC application, sending the SDP Answer information to the browser engine by using the WEB-based RTC application, and sending the SDP Answer information to the RTC server through the browser engine, so that the RTC server sends the SDP Answer information to the browser engine of the terminal sending the call request information, so as to establish a communication channel for starting communication.

With reference to the first aspect or the first possible implementation manner of the first aspect or the second possible implementation manner of the first aspect or the third possible implementation manner of the first aspect, in a fifth possible implementation manner, the call request information further carries Session Description Protocol Offer (SDP Offer) information for session negotiation; and the sending, by the first terminal, request information for opening the WEB-based RTC application to the RTC server, and after receiving information of the WEB-based RTC application returned by the RTC server, communicating, by using the WEB-based RTC application, with the terminal sending the call request information specifically includes:

sending, by the first terminal, the request information for opening the WEB-based RTC application to the RTC server, where the request information for opening the WEB-based RTC application carries SDP Answer information, so that after receiving the request information for opening the WEB-based RTC application, the RTC server returns the information of the WEB-based RTC application to the first terminal, and sends the SDP Answer information in the request information for opening the WEB-based RTC application to the browser engine of the terminal sending the call request information, so as to establish a communication channel; and receiving, by the first terminal, the information of the WEB-based RTC application returned by the RTC server, and communicating, by using the WEB-based RTC application, with the terminal sending the call request information.

With reference to the first aspect or the first possible implementation manner of the first aspect or the second possible implementation manner of the first aspect or the third possible implementation manner of the first aspect, in a sixth possible implementation manner, the sending, by the first terminal, request information for opening the WEB-based RTC application to the RTC server, and after receiving information of the WEB-based RTC application returned by the RTC server, communicating, by using the WEB-based RTC application, with the terminal sending the call request information specifically includes:

sending, by the first terminal through the browser engine, the request information for opening the WEB-based RTC application to the RTC server; and after receiving the information of the WEB-based RTC application and SDP Offer information that are returned by the RTC server, generating SDP Answer information according to the SDP Offer information by using the WEB-based RTC application, sending the SDP Answer information to the browser engine by using the WEB-based RTC application, and sending the SDP Answer information to the RTC server through the browser engine, so that the RTC server sends the SDP Answer information to the browser engine of the terminal sending the call request information, so as to establish a communication channel for starting communication.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect, in a seventh possible implementation manner, the call request information carries prompt information, and the prompt information is added when the RTC server receives the call request information sent by the another terminal to the first terminal; and after receiving the call request information, the first terminal generates a corresponding prompt according to the prompt information in the call request information, where the corresponding prompt includes vibration, ringing, or a pop-up prompt box.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect, in an eighth possible implementation manner, the method further includes:

feeding back, by the first terminal when rejecting the call request, rejection information to the RTC server, so that after receiving the rejection information, the RTC server feeds back information indicating that the first terminal is currently busy or offline to the terminal sending the call request information.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect or the eighth possible implementation manner of the first aspect, in a ninth possible implementation manner, the type of the WEB-based RTC application corresponding to the request information for opening the WEB-based RTC application is the same as or different from the type of the WEB-based RTC application of the terminal sending the call request information, where the request information for opening the WEB-based RTC application is sent by the first terminal to the RTC server.

According to a second aspect, a real time communication method is provided. The method includes:

sending, by a real time communication RTC server after receiving call request information sent by another terminal to a first terminal, the call request information to the first terminal, where the call request information carries a unique identifier of a WEB-based RTC application of the terminal sending the call request information; and returning, by the RTC server, information of the WEB-based RTC application to the first terminal after receiving request information that is used for opening the WEB-based RTC application and sent by the first terminal, so that after receiving the information of the WEB-based RTC application returned by the RTC server, the first terminal communicates, by using the WEB-based RTC application, with the terminal sending the call request information.

In a first possible implementation manner of the second aspect, before step of receiving, by the RTC server, call request information sent by another terminal to a first terminal, the method further includes:

enabling, by the RTC server after receiving request information for registering an offline service sent by the first terminal, an offline mode for a WEB-based RTC application corresponding to a unique identifier of the WEB-based RTC application in the information, and feeding back success response information to the first terminal, so that the first terminal closes the WEB-based RTC application after receiving the success response information fed back by the RTC server.

With reference to the first possible implementation manner of the second aspect, in a second possible implementation manner, the enabling, by the RTC server after receiving request information for registering an offline service, an offline mode for a WEB-based RTC application corresponding to a unique identifier specifically includes:

after receiving the request information for registering an offline service, determining, by the RTC server according to the unique identifier of the WEB-based RTC application carried in the request information for registering an offline service, whether the WEB-based RTC application corresponding to the unique identifier has permission to request registration of the offline service, and if yes, enabling the offline mode for the WEB-based RTC application corresponding to the unique identifier.

In a third possible implementation manner of the second aspect, the request information for opening the WEB-based RTC application further carries a type of a WEB-based RTC application selected by a user; and the returning, by the RTC server, information of the WEB-based RTC application to the first terminal after receiving request information that is used for opening the WEB-based RTC application and sent by the first terminal includes:

returning, by the RTC server, information of a WEB-based RTC application with a same type as the WEB-based RTC application to the first terminal after receiving the request information that is used for opening the WEB-based RTC application and sent by the first terminal.

With reference to the second aspect or the first possible implementation manner of the second aspect or the second possible implementation manner of the second aspect or the third possible implementation manner of the second aspect, in a fourth possible implementation manner, the method further includes:

adding, by the RTC server, prompt information into the call request information after receiving the call request information sent by the another terminal to the first terminal, so that the first terminal generates a corresponding prompt according to the prompt information in the call request information after receiving the call request information, where the corresponding prompt includes vibration, ringing or a pop-up prompt box.

With reference to the second aspect or the first possible implementation manner of the second aspect or the second possible implementation manner of the second aspect or the third possible implementation manner of the second aspect or the fourth possible implementation manner of the second aspect, in a fifth possible implementation manner, the method further includes:

feeding back, by the RTC server after receiving information that indicates rejection of the call request and is sent by the first terminal, information indicating that the first terminal is currently busy or offline to the terminal sending the call request information.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect, in a sixth possible implementation manner, the method further includes:

after the RTC server sends the call request information to the first terminal, if no information fed back by the first terminal is received within a preset time or received feedback information indicates not to receive for now, caching, by the RTC server, the call request information, and sending the call request information again after a preset time or after the first terminal opens the WEB-based RTC application.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect or the sixth possible implementation manner of the second aspect, in a seventh possible implementation manner, the type of the WEB-based RTC application corresponding to the information of the WEB-based RTC application returned by the RTC server is the same as or different from the type of the WEB-based RTC application of the terminal sending the call request information.

According to a third aspect, a terminal device is provided, where the terminal device includes:

an information receiving unit, configured to receive call request information that is sent by another terminal to a terminal device and forwarded by a real time communication RTC server, where the call request information carries a unique identifier of a WEB-based RTC application of the terminal sending the call request information; and a processing unit, configured to determine, according to the unique identifier of the WEB-based RTC application of the terminal sending the call request information, whether to accept a call request, where the unique identifier is carried in the call request information received by the information receiving unit; if it is determined that the call request needs to be accepted, send request information for opening the WEB-based RTC application to the RTC server, and after receiving information of the WEB-based RTC application returned by the RTC server, communicate, by using the WEB-based RTC application, with the terminal sending the call request information.

In a first possible implementation manner of the third aspect, the terminal device further includes:

an information sending unit, configured to send, to the real time communication RTC server, request information for registering an offline service, where the information carries a unique identifier of a WEB-based RTC application, so that after receiving the request information for registering an offline service, the RTC server enables an offline mode for the WEB-based RTC application corresponding to the unique identifier, and feeds back success response information to the first terminal; and a closing unit, configured to close the WEB-based RTC application after the success response information fed back by the RTC server is received.

In a second possible implementation manner of the third aspect, the request information for opening the WEB-based RTC application further carries a type of a WEB-based RTC application selected by a user, so that after receiving the request information for opening the WEB-based RTC application, the RTC server returns a WEB-based RTC application with a same type as the WEB-based RTC application.

In a third possible implementation manner of the third aspect, the call request information further carries identification information of a browser engine of the terminal sending the call request information; and the information receiving unit is specifically configured to receive, through a monitoring client of the terminal device, the call request information sent by the RTC server, parse the call request information, determine, according to the identification information of the browser engine in the call request information, that the call request information is information sent to a browser engine, and send the call request information to a browser engine of the first terminal.

With reference to the third aspect or the first possible implementation manner of the third aspect or the second possible implementation manner of the third aspect or the third possible implementation manner of the third aspect, in a fourth possible implementation manner, the call request information further carries Session Description Protocol Offer (SDP Offer) information for session negotiation; and the processing unit is specifically configured to send request information for opening the WEB-based RTC application to the RTC server through the browser engine of the terminal device, and after receiving the information of the WEB-based RTC application returned by the RTC server, send the SDP Offer information in the call request information to the WEB-based RTC application, generate SDP Answer information according to the SDP Offer information by using the WEB-based RTC application, send the SDP Answer information to the browser engine by using the WEB-based RTC application, and send the SDP Answer information to the RTC server through the browser engine, so that the RTC server sends the SDP Answer information to the browser engine of the terminal sending the call request information, so as to establish a communication channel for starting communication.

With reference to the third aspect or the first possible implementation manner of the third aspect or the second possible implementation manner of the third aspect or the third possible implementation manner of the third aspect, in a fifth possible implementation manner, the call request information further carries Session Description Protocol Offer (SDP Offer) information for session negotiation; and the processing unit is specifically configured to send request information for opening the WEB-based RTC application to the RTC server through the browser engine of the terminal device, where the request information for opening the WEB-based RTC application carries SDP Answer information, so that the RTC server returns the information of the WEB-based RTC application to the first terminal after receiving the request information for opening the WEB-based RTC application, and sends the SDP Answer information in the request information for opening the WEB-based RTC application to the browser engine of the terminal sending the call request information, so as to establish a communication channel; and after receiving the information of the WEB-based RTC application returned by the RTC server, communicate, by using the WEB-based RTC application, with the terminal sending the call request information.

With reference to the third aspect or the first possible implementation manner of the third aspect or the second possible implementation manner of the third aspect or the third possible implementation manner of the third aspect, in a sixth possible implementation manner, the processing unit is specifically configured to send request information for opening the WEB-based RTC application to the RTC server through the browser engine of the terminal device, and after receiving the information of the WEB-based RTC application and SDP Offer information that are returned by the RTC server, generate SDP Answer information according to the SDP Offer information by using the WEB-based RTC application, send the SDP Answer information to the browser engine by using the WEB-based RTC application, and send the SDP Answer information to the RTC server through the browser engine, so that the RTC server sends the SDP Answer information to the browser engine of the terminal sending the call request information to establish a communication channel for starting communication.

With reference to the third aspect or the first possible implementation manner of the third aspect or the second possible implementation manner of the third aspect or the third possible implementation manner of the third aspect or the fourth possible implementation manner of the third aspect or the fifth possible implementation manner of the third aspect or the sixth possible implementation manner of the third aspect, in a seventh possible implementation manner, the call request information carries prompt information, and the prompt information is added when the RTC server receives the call request information sent by the another terminal to the first terminal; and the terminal device further includes:

a prompting unit, configured to generate a corresponding prompt according to the prompt information in the call request information after the call request information is received, where the corresponding prompt includes vibration, ringing, or a pop-up prompt box.

With reference to the third aspect or the first possible implementation manner of the third aspect or the second possible implementation manner of the third aspect or the third possible implementation manner of the third aspect or the fourth possible implementation manner of the third aspect or the fifth possible implementation manner of the third aspect or the sixth possible implementation manner of the third aspect or the seventh possible implementation manner of the third aspect, in an eighth possible implementation manner, the terminal device further includes:

an information feedback unit, configured to, when the call request is rejected, feed rejection information back to the RTC server, so that after receiving the rejection information, the RTC server feeds back information indicating that the first terminal is currently busy or offline to the terminal sending the call request information.

With reference to the third aspect or the first possible implementation manner of the third aspect or the second possible implementation manner of the third aspect or the third possible implementation manner of the third aspect or the fourth possible implementation manner of the third aspect or the fifth possible implementation manner of the third aspect or the sixth possible implementation manner of the third aspect or the seventh possible implementation manner of the third aspect or the eighth possible implementation manner of the third aspect, in a ninth possible implementation manner, the type of the WEB-based RTC application corresponding to the request information that is used for opening the WEB-based RTC application and sent by the first terminal to the RTC server is the same as or different from the type of the WEB-based RTC application of the terminal sending the call request information.

According to a fourth aspect, a real time communication RTC server is provided, where the RTC server includes:

a first sending unit, configured to, after call request information sent by another terminal to a first terminal is received, send the call request information to the first terminal, where the call request information carries a unique identifier of a WEB-based RTC application of the terminal sending the call request information; and a second sending unit, configured to, after request information that is used for opening the WEB-based RTC application and sent by the first terminal is received, return information of the WEB-based RTC application to the first terminal, so that after receiving the information of the WEB-based RTC application returned by the RTC server, the first terminal communicates, by using the WEB-based RTC application, with the terminal sending the call request information.

In a first possible implementation manner of the fourth aspect, the RTC server further includes:

an enabling unit, configured to, after request information for registering an offline service sent by the first terminal is received, enable an offline mode for a WEB-based RTC application corresponding to a unique identifier of the WEB-based RTC application in the information, and feed back success response information to the first terminal, so that after receiving the success response information fed back by the RTC server, the first terminal closes the WEB-based RTC application.

With reference to the first possible implementation manner of the fourth aspect, in a second possible implementation manner, the enabling unit is specifically configured to, after the request information for registering an offline service is received, determine, according to the unique identifier of the WEB-based RTC application carried in the request information for registering an offline service, whether the WEB-based RTC application corresponding to the unique identifier has permission to request registration of the offline service, and if yes, enable the offline mode for the WEB-based RTC application corresponding to the unique identifier.

In a third possible implementation manner of the fourth aspect, the request information for opening the WEB-based RTC application further carries a type of a WEB-based RTC application selected by a user; and the second sending unit is specifically configured to return information of a WEB-based RTC application with a same type as the WEB-based RTC application to the first terminal after the request information that is used for opening the WEB-based RTC application and sent by the first terminal is received.

With reference to the fourth aspect or the first possible implementation manner of the fourth aspect or the second possible implementation manner of the fourth aspect or the third possible implementation manner of the fourth aspect, in a fourth possible implementation manner, the RTC server further includes:

an information adding unit, configured to add prompt information into the call request information after the call request information sent by the another terminal to the first terminal is received, so that after receiving the call request information, the first terminal generates a corresponding prompt according to the prompt information in the call request information, where the corresponding prompt includes vibration, ringing or a pop-up prompt box.

With reference to the fourth aspect or the first possible implementation manner of the fourth aspect or the second possible implementation manner of the fourth aspect or the third possible implementation manner of the fourth aspect or the fourth possible implementation manner of the fourth aspect, in a fifth possible implementation manner, the RTC server further includes:

a third sending unit, configured to, after receiving information that indicates rejection of the call request and is sent by the first terminal, feed back information indicating that the first terminal is currently busy or offline to the terminal sending the call request information.

With reference to the fourth aspect or the first possible implementation manner of the fourth aspect or the second possible implementation manner of the fourth aspect or the third possible implementation manner of the fourth aspect or the fourth possible implementation manner of the fourth aspect or the fifth possible implementation manner of the fourth aspect, in a sixth possible implementation manner, the RTC server further includes:

a processing unit, configured to, after the call request information is sent to the first terminal, if no information fed back by the first terminal is received within a preset time or received feedback information indicates not to receive for now, cache the call request information, and send the call request information again after a preset time or after the first terminal opens the WEB-based RTC application.

With reference to the fourth aspect or the first possible implementation manner of the fourth aspect or the second possible implementation manner of the fourth aspect or the third possible implementation manner of the fourth aspect or the fourth possible implementation manner of the fourth aspect or the fifth possible implementation manner of the fourth aspect or the sixth possible implementation manner of the fourth aspect, in a seventh possible implementation manner, the type of the WEB-based RTC application corresponding to the information of the WEB-based RTC application returned to the first terminal is the same as or different from the type of the WEB-based RTC application of the terminal sending the call request information.

According to a fifth aspect, a real time communication system is provided, where the system includes the terminal device and/or the RTC server.

It can be seen from the foregoing technical solutions that, in the embodiments of the present invention, if a WEB-based RTC application of a terminal is closed, the terminal can still receive call request information that is sent by another terminal to the terminal and forwarded by an RTC server; after receiving the call request information, the terminal sends request information for opening the WEB-based RTC application to the RTC server; and after receiving information of the WEB-based RTC application returned by the RTC server, the terminal communicates, by using the WEB-based RTC application, with the terminal sending the call request information. In the embodiments of the present invention, the following problem can be effectively solved: In existing WEB-based real time communication, information cannot be acquired when two parties in communication are not simultaneously online or the WEB-based RTC application is not opened. In addition, a call can further be accepted selectively according to a unique identifier of a WEB-based RTC application of the terminal sending the call request information, which improves user experience and achieves high practicability.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

In addition, the terms "system" and "network" in the embodiments of the present invention may be used interchangeably in the specification. The term "and/or" in the embodiments of the present invention describes only an association relationship for describing associated objects and represents that three relationships may exist. For example, A and/or B may represent the following three cases: only A exists, both A and B exist, and only B exists. In addition, the character "/" in the embodiments of the present invention generally indicates an "or" relationship between the associated objects.

To describe the technical solutions of the present invention, the following uses specific embodiments for description.

Figure 1:
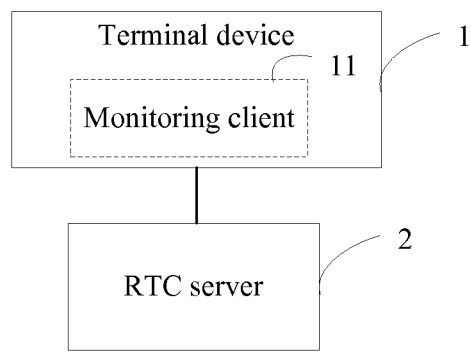
FIG. 1 is a network architecture diagram of a real time communication system according to an embodiment of the present invention.

FIG. 1 is a network architecture diagram of a system to which a real time communication method is applicable according to an embodiment of the present invention. For ease of description, only a part related to this embodiment is shown.

As shown in FIG. 1, the system includes a terminal device 1 and an RTC server 2.

The terminal device 1 may be any terminal device having a network access function, including but not limited to a mobile phone, a tablet, a desktop computer, a notebook computer, a television, a set top box, a home gateway, and a wearable device.

The RTC server 2 may be one single server, and may also be a server end jointly formed by several functional servers, for example, a WEB server providing a service for the terminal device 1, a WEB server providing a service for a browser used by the terminal device 1, or a WEB server providing a service for a WEB-based RTC application used by the terminal device 1. Different WEB-based RTC applications may have different WEB servers, and therefore, the RTC server 2 may be a combination of a plurality of different WEB servers, so as to implement communication among different browsers, different networks and different WEB-based RTC applications, and to complete functions of protocol conversion, message transformation, route addressing, connection establishment, page optimization, acceleration, information addition, and the like.

In this embodiment, after receiving call request information sent by another terminal to the terminal device 1, the RTC server 2 sends the call request information to the terminal device 1, where the call request information carries a unique identifier, for example, Zhangsan@msh.webrtc.com, representing information sent by Zhang San by using real time communication MSN, of a WEB-based RTC application of the terminal sending the call request information. It should be noted that the unique identifier of the WEB-based RTC application may further include information of the terminal sending the call request information, such as a terminal type iphone or ipad. Therefore, the unique identifier includes a user identity of the terminal sending the call request information, and/or an identifier of the used WEB-based RTC application, and/or an identifier of a type of the used terminal.

After receiving the call request information, the terminal device 1 determines, according to the unique identifier of the WEB-based RTC application of the terminal sending the call request information, whether to accept the call request, sends, if it is determined that the call request needs to be accepted, request information for opening the WEB-based RTC application to the RTC server 2, and communicates, by using the WEB-based RTC application after receiving information of the WEB RC application returned by the RTC server 2, with the terminal sending the call request information. A type of the WEB-based RTC application corresponding to the request information that is used for opening the WEB-based RTC application and sent to the RTC server 2 is the same as or different from a type of the WEB-based RTC application of the terminal sending the call request information.

It should be noted that, the opening the WEB-based RTC application includes: switching the WEB-based RTC application from an offline mode to an online mode, or from a disable state to an enable state.

Preferably, in this embodiment, before the terminal device 1 receives the call request information that is sent to the terminal device 1 by the another terminal and forwarded by the RTC server 2, the method may further include:

The terminal device 1 sends, to the RTC server 2, request information for registering an offline service, where the information carries a unique identifier (for example, a QQ number and an MSN number) of a WEB-based RTC application needing to perform an offline service. After receiving the request information for registering an offline service, the RTC server 2 enables the offline mode for the WEB-based RTC application corresponding to the unique identifier, and feeds back success response information to the terminal device 1. After receiving the success response information fed back by the RTC server 2, the terminal device 1 closes the WEB-based RTC application (closes a browser and/or closes the currently running WEB-based RTC application). Closing the currently running WEB-based RTC application includes: exiting the currently running WEB-based RTC application or switching the currently running WEB-based RTC application from the online mode to the offline mode.

The request information for opening the WEB-based RTC application may further carry a type of a WEB-based RTC application selected by a user, so that after receiving the request information for opening the WEB-based RTC application, the RTC server 2 returns a WEB-based RTC application with a same type as the WEB-based RTC application selected by the user. The type of the WEB-based RTC application may be the same as or different from the type of the WEB-based RTC application in the call request information.

It should be noted that, the type of the WEB-based RTC application described in this application may specifically refer to an identifier of the WebRTC application, such as name identifiers used for distinguishing different WebRTC applications providing web-based real time communication services.

It should be noted that, when the user does not select the type of the WEB-based RTC application, the terminal device 1 or the RTC server 2 may select a default (preset) type of the WEB-based RTC application.

Preferably, after receiving the request information for registering an offline service, the RTC server 2 determines, according to the unique identifier of the WEB-based RTC application carried in the request information for registering an offline service, whether the WEB-based RTC application corresponding to the unique identifier has permission to request registration of the offline service, and if yes, enables the offline mode for the WEB-based RTC application corresponding to the unique identifier.

Preferably, the terminal device 1 may further include a monitoring client 11. After receiving the call request information sent by the another terminal to the terminal device 1, the RTC server 2 sends the call request information to the monitoring client 11 first, so that the monitoring client 11 sends the call request information to the terminal device 1. Further, after receiving the call request information sent by the another terminal to a user of the terminal device 1, the RTC server 2 may choose to send the call request information to the monitoring client 11 of the user of the terminal device 1. The monitoring client 11 (for example, it may be a push client) receives a service message actively sent by a network side. The service message may be "a Push message carrying the call request information", where the Push message may be carried in any one of the following message formats so as to be sent to the terminal device 1, and the message formats include: SMS (short message service, short message service), MMS (multimedia messaging service, multimedia messaging service), websocket (Websocket), JSON (JavaScript Object Notation, JavaScript object notation), Extensible Messaging and Presence Protocol XMPP (Extensible Messaging and Presence Protocol) Asynchronous JavaScript and XML AJAX (Asynchronous JavaScript and XML), SIP (Session Initiation Protocol, Session Initiation Protocol), XML-based Hypertext Transport Protocol request (XMLHTTPRequest), and the like. Optionally, the call request information may further carry identification information, such as browser.ua, of a browser engine of the terminal sending the call request information.

That the terminal device 1 receives call request information sent by the RTC server 2 includes:

After receiving the call request information sent by the RTC server 2, the monitoring client 11 parses the call request information, determines, according to the identification information of the browser engine in the call request information, that the call request information is information sent to a browser engine, and sends the call request information to a browser engine of the terminal device 1 for processing. The identification information of the browser engine may be carried in the call request information sent by the terminal sending the call request information, and the identification information of the browser engine may also be added after the RTC server 2 receives the call request information. The browser engine is used to parse information carried in the call request information, so as to further run the WEB-based RTC application. The browser engine may be a functional module, such as webkit, in an operating system, and may be a functional module in a browser client. The WEB-based RTC application may run in a browser, and may also run, independent of the browser, in a WEB application form based on the browser engine in the operating system.

Preferably, the call request information may further carry Session Description Protocol Offer (SDP Offer) information for session negotiation.

That the terminal device 1 sends request information for opening the WEB-based RTC application to the RTC server 2, and communicates, by using the WEB-based RTC application after receiving information of the WEB-based RTC application returned by the RTC server 2, with the terminal sending the call request information specifically includes:

The terminal device 1 sends the request information for opening the WEB-based RTC application to the RTC server 2 through the browser engine, and after receiving the information of the WEB-based RTC application returned by the RTC server 2, sends the SDP Offer information in the call request information to the WEB-based RTC application, generates SDP Answer information according to the SDP Offer information by using the WEB-based RTC application, sends the SDP Answer information to the browser engine by using the WEB-based RTC application, and sends the SDP Answer information to the RTC server 2 through the browser engine, so that the RTC server 2 sends the SDP Answer information to the browser engine of the terminal sending the call request information, so as to establish a communication channel for starting communication.

Alternatively, the terminal device 1 sends request information for opening a WEB-based RTC application to the RTC server 2 through the browser engine, where the request information carries SDP Answer information that is generated by the browser engine according to the SDP Offer information carried in the call request, so that the RTC server 2 sends the SDP Answer information to the browser engine of the terminal sending the call request information to establish a communication channel for starting communication. After receiving the request information that is used for opening the WEB-based RTC application and sent by the terminal device 1, the RTC server 2 returns the WEB-based RTC application to the terminal device 1 for presenting.

Preferably, the Session Description Protocol Offer (SDP Offer) for session negotiation may be temporarily cached by the RTC server 2 for the terminal device 1, instead of being carried in the call request information to be sent to the terminal device 1.

The terminal device 1 sends the request information for opening the WEB-based RTC application to the RTC server 2 through the browser engine, and after receiving the information of the WEB-based RTC application and SDP Offer information that are returned by the RTC server 2, generates SDP Answer information according to the SDP Offer information by using the WEB-based RTC application, sends the SDP Answer information to the browser engine by using the WEB-based RTC application, and sends the SDP Answer information to the RTC server 2 through the browser engine, so that the RTC server 2 sends the SDP Answer information to the browser engine of the terminal sending the call request information to establish a communication channel for starting communication.

It should be noted that, after receiving the request information that is used for opening the WEB-based RTC application and sent by the terminal device 1, the RTC server 2 may return the information of the WEB-based RTC application to the terminal device 1, and may also return the information of the WEB-based RTC application and the cached SDP Offer information.

Preferably, after receiving the call request information sent by the another terminal to the terminal device 1, the RTC server 2 adds prompt information into the call request information, so that after receiving the call request information, the terminal device 1 generates a corresponding prompt according to the prompt information in the call request information, where the corresponding prompt includes but is not limited to vibration, ringing or a pop-up prompt box.

Preferably, after receiving the call request information, the terminal device 1 determines, according to the unique identifier of the terminal sending the call request information, whether to accept the call request, and if it determines to reject the call request, feeds rejection information back to the RTC server 2, so that after receiving the rejection information, the RTC server 2 feeds back information indicating that the terminal device 1 is currently busy or offline to the terminal sending the call request information.

Optionally, after the RTC server 2 sends the call request information to the terminal device 1, if no information fed back by the terminal device 1 is received within a preset time or received feedback information is not to receive for now, the RTC server 2 caches the call request information, and sends the call request information again after a preset time or after the terminal device 1 opens the WEB-based RTC application. The RTC server 2 may further generate prompt information, and store the information for the user for query by the terminal device 1, or actively send the information to the terminal device 1. The prompt information may be text information or information of a multimedia type, such as audio and video. The prompt information may prompt the user of information, such as the sender of the call request, call time, a type of the used WEB-based RTC application, and a type of a browser. When the user logs in to the WEB-based RTC application or opens the browser next time, a notification message of a missed call or a message may be received.

The system scenario provided in this embodiment is used only to explain the present invention instead of limiting the protection scope of the present invention.

Figure 2:
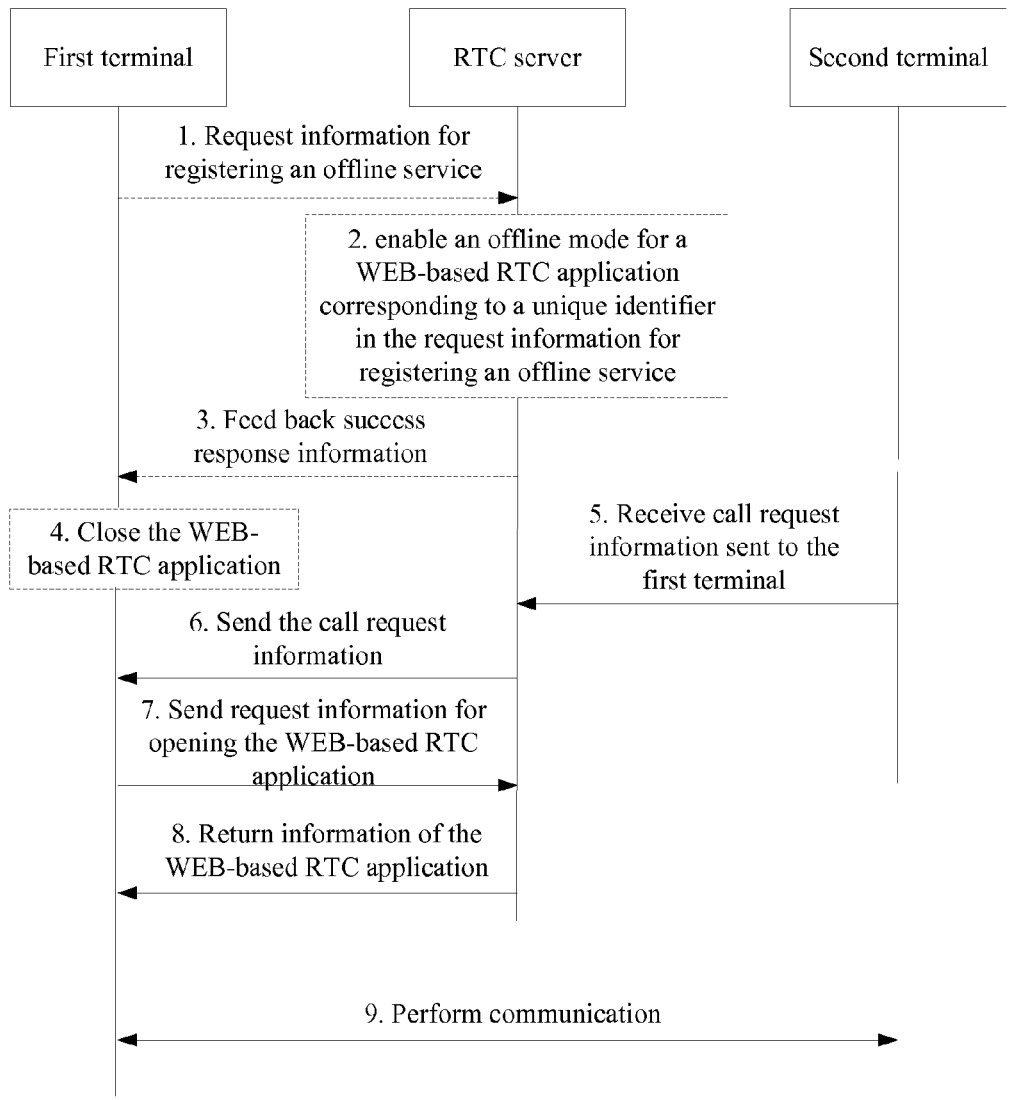
FIG. 2 is an interaction flowchart of a real time communication method according to another embodiment of the present invention.

FIG. 2 illustrates an interaction process of a real time communication method according to another embodiment of the present invention. The process of the method is described in detail as follows:

1. A first terminal (terminal device 1) sends, to a real time communication RTC server, request information for registering an offline service, where the information carries a unique identifier of a WEB-based RTC application.

In this embodiment, the request information for registering an offline service carries the unique identifier of the WEB-based RTC application, and the unique identifier includes a type of the WEB-based RTC application and an identifier corresponding to the type, for example, QQ+Zhang San (or a corresponding QQ number). The WEB-based RTC application includes but is not limited to a client program having a WEB application function, a WEB technology-based widget application in a packed format, and a WEB application based on a browser engine, for example, WEB QQ.

In this embodiment, a purpose of sending, by the first terminal to the real time communication RTC server, the request information for registering an offline service is to inform the server that the first terminal will close the WEB-based RTC application (including closing the WEB-based RTC application or closing a browser), but hopes that it still can receive call request information or other notification information or the like sent by another terminal to the first terminal after the WEB-based RTC application is closed.

2. After receiving the request information for registering an offline service, the RTC server enables an offline mode for the WEB-based RTC application corresponding to the unique identifier.

Preferably, to enhance security and prevent malicious registration, after receiving the request information for registering an offline service, the RTC server determines, according to the unique identifier of the WEB-based RTC application carried in the request information for registering an offline service, whether the WEB-based RTC application corresponding to the unique identifier has permission to request registration of the offline service, and if yes, enables the offline mode for the WEB-based RTC application corresponding to the unique identifier, so that the RTC server enables the first terminal to stay in an online state, provides notification, and saves call information for the first terminal, and the like.

3. The RTC server feeds back success response information to the first terminal.

4. After receiving the success response information fed back by the RTC server, the first terminal closes the WEB-based RTC application. For example, a user closes a browser application program, and the user may be in a standby state, may run another application or run another browser, and the like.

5. The RTC server receives call request information sent by another terminal (a second terminal) to the first terminal.

In this embodiment, the second terminal may be any terminal device having a network access function, including but not limited to a mobile phone, a tablet, a desktop computer, a television, a set top box, a home gateway, a notebook computer, and the like.

It should be noted that, when the second terminal is a conventional terminal without a WEB capability, the call request information needs to be sent to the RTC server after protocol and message conversion is completed by using another gateway (for example, an RTC server proxy gateway, a Session Initiation Protocol (Session Initiation Protocol, SIP) proxy gateway, or a media gateway.

6. The RTC server sends the call request information to the first terminal, where the call request information carries the unique identifier of the WEB-based RTC application of the terminal sending the call request information and a type of the WEB-based RTC application.

Specifically, the RTC server determines whether the first terminal opens the WEB-based RTC application; if no, determines whether the first terminal enables the offline state; and if yes, sends the call request information to a monitoring client, so that after receiving the call request information sent by the RTC server, the monitoring client parses the call request information, determines, according to identification information of a browser engine in the call request information, that the call request information is information sent to a browser engine, and sends the call request information to a browser engine of the first terminal.

7. The first terminal sends request information for opening the WEB-based RTC application to the RTC server, which specifically includes that: after receiving the call request information, the first terminal determines, according to the unique identifier of the terminal sending the call request information, whether to accept the call request, and if it is determined that the call request needs to be accepted, sends the request information for opening the WEB-based RTC application to the RTC server, where the request information for opening the WEB-based RTC application may further carry a type of a WEB-based RTC application selected by a user, so that after receiving the request information for opening the WEB-based RTC application, the RTC server returns a WEB-based RTC application with a same type as the WEB-based RTC application selected by the user. The type of the WEB-based RTC application may be the same as or different from the type of the WEB-based RTC application in the call request information. For example, the first terminal registers the offline service by using a WEB QQ application, the second terminal calls a user of the first terminal by using an MSN application, and the first terminal may request the RTC server to open the WEB QQ application to communicate with a user of the second terminal.

8. The RTC returns information of the WEB-based RTC application to the first terminal after receiving the request information for opening the WEB-based RTC application.

The type of the WEB-based RTC application corresponding to the information of the WEB-based RTC application returned to the first terminal is the same as or different from the type of the WEB-based RTC application of the terminal sending the call request information.

9. The first terminal communicates, by using the WEB-based RTC application, with the terminal (the second terminal) sending the call request information.

Preferably, the call request information further carries identification information of a browser engine of the terminal sending the call request information;

That the first terminal receives call request information sent by the RTC server includes:

after receiving the call request information sent by the RTC server, the monitoring client of the first terminal parses the call request information, determines, according to the identification information of the browser engine in the call request information, that the call request information is information sent to the browser engine, and sends the call request information to the browser engine of the first terminal.

That the first terminal sends request information for opening the WEB-based RTC application to the RTC server, and after receiving the information of the WEB-based RTC application returned by the RTC server, communicates, by using the WEB-based RTC application, with the terminal sending the call request information specifically includes:

the terminal device sends, through the browser engine, the request information for opening the WEB-based RTC application to the RTC server, and after receiving the information of the WEB-based RTC application returned by the RTC server, sends SDP Offer information in the call request information to the WEB-based RTC application, generates SDP Answer information according to the SDP Offer information by using the WEB-based RTC application, sends the SDP Answer information to the browser engine by using the WEB-based RTC application, and sends the SDP Answer information to the RTC server through the browser engine, so that the RTC server sends the SDP Answer information to the browser engine of the terminal sending the call request information, so as to establish a communication channel for starting communication;

or, the terminal device sends the request information for opening the WEB-based RTC application to the RTC server through the browser engine, where the request information for opening the WEB-based RTC application carries SDP Answer information, so that the RTC server returns the information of the WEB-based RTC application to the first terminal after receiving the request information for opening the WEB-based RTC application, and sends the SDP Answer information in the request information for opening the WEB-based RTC application to the browser engine of the terminal sending the call request information, so as to establish a communication channel; and the first terminal receives the information of the WEB-based RTC application returned by the RTC server, and communicates, by using the WEB-based RTC application, with the terminal sending the call request information.

Preferably, that the first terminal sends request information for opening the WEB-based RTC application to the RTC server, and after receiving the information of the WEB-based RTC application returned by the RTC server, communicates, by using the WEB-based RTC application, with the terminal sending the call request information specifically includes:

the first terminal sends the request information for opening the WEB-based RTC application to the RTC server through the browser engine, and after receiving the information of the WEB-based RTC application and SDP Offer information that are returned by the RTC server, generates SDP Answer information according to the SDP Offer information by using the WEB-based RTC application, sends the SDP Answer information to the browser engine by using the WEB-based RTC application, and sends the SDP Answer information to the RTC server through the browser engine, so that the RTC server sends the SDP Answer information to the browser engine of the terminal sending the call request information to establish a communication channel for starting communication.

Preferably, to enhance user experience and improve practicability, after receiving the call request information sent by the another terminal to the first terminal, the RTC server adds prompt information into the call request information, so that after receiving the call request information, the first terminal generates a corresponding prompt, including but not limited to vibration, ringing or a pop-up prompt box, according to the prompt information in the call request information. The prompt information may be implemented by using a script language, for example, in manners such as Java Script and a lightweight data interchange format language JSON (JavaScript Object Notation), or the like. For example, when the prompt information is vibration, the browser engine parses the prompt information, and invokes a vibration application programming interface API to complete a vibration prompt, for example, navigator.vibrate ([1000, 500, 2000]), indicating vibration of 1 second and pause of 0.5 second, and a total vibration duration is 2 seconds. For another example, when the prompt information is a pop-up prompt box, an interactive API interface is invoked, for example, the prompt box pops up in an Alert manner: Alert("second terminal", www.WEBqq.com, "opera mini", "whether to answer a call").

Preferably, to further enhance user experience, this embodiment further includes:

when rejecting the call request, the first terminal feeds back rejection information to the RTC server; and after receiving the rejection information, the RTC server feeds back information indicating that the first terminal is currently busy or offline to the terminal sending the call request information.

It should be noted that, the communication in this embodiment may be multi-party communication, and information in the communication includes audio, video, text, data, and the like. In multi-party communication, information carrying unique identifiers of multiple parties are sent to the browser engine of the first terminal for parsing, and the first terminal selects a corresponding terminal device for communication according to the unique identifiers that are obtained after the parsing.

Preferably, after the RTC server sends the call request information to the first terminal, if no information fed back by the first terminal is received within a preset time or received feedback information is not to receive for now, the RTC server caches the call request information, and sends the call request information again after a preset time or after the first terminal opens the WEB-based RTC application. The RTC server may further generate prompt information, and store the information for the user for query by the terminal device, or actively send the information to the terminal device. The prompt information may be text information or information of a multimedia type, such as audio and video. The prompt information may prompt the user of information, such as a sender of sending a call, call time, a type of the used WEB-based RTC application, and a type of a browser. When the user logs in to the WEB-based RTC application or opens the browser next time, a notification message of a missed call or a message may be received.

It should be noted that a browser activated by the first terminal in this embodiment may be the same as or different from a browser of the second terminal. A network used by the first terminal in this embodiment may also be the same as or different from a network of the second terminal. For example, when a peer party uses a fixed-line telephone to call the WEB QQ, the RTC server only needs to perform some routing and protocol conversion correspondingly.

Figure 3:
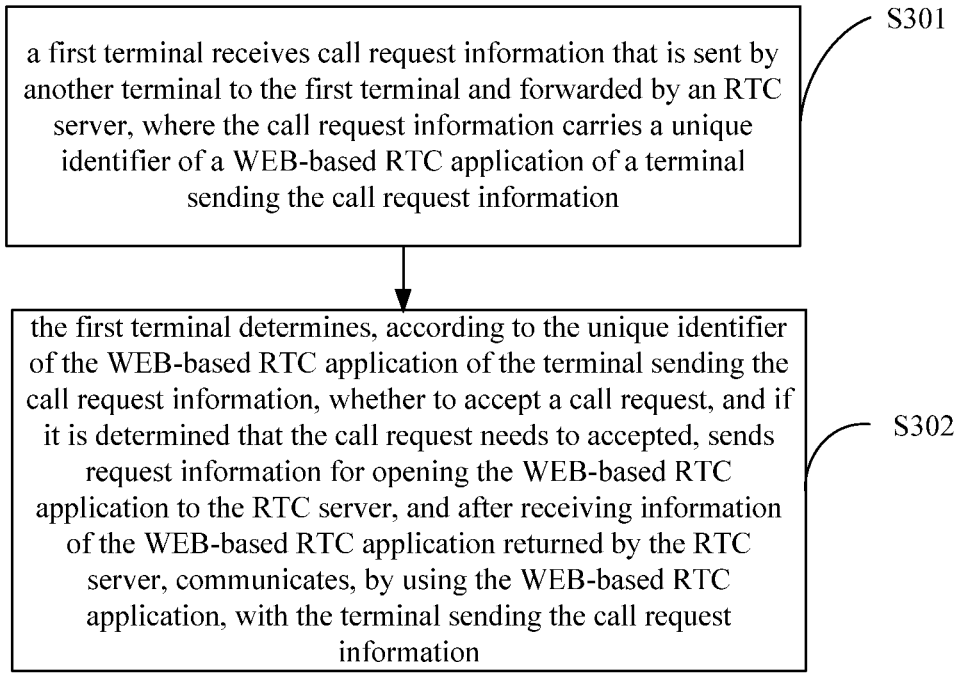
FIG. 3 is an implementation flowchart of a real time communication method according to another embodiment of the present invention.

FIG. 3 illustrates an implementation process of a real time communication method according to another embodiment of the present invention. This embodiment is executed by the terminal device 1 in FIG. 1. The process of the method is described in detail as follows:

In step S301, a first terminal receives call request information that is sent by another terminal to the first terminal and forwarded by an RTC server, where the call request information carries a unique identifier of a WEB-based RTC application of a terminal sending the call request information.

In step S302, the first terminal determines, according to the unique identifier of the WEB-based RTC application of the terminal sending the call request information, whether to accept a call request, and if it is determined that the call request needs to accepted, sends request information for opening the WEB-based RTC application to the RTC server, and after receiving information of the WEB-based RTC application returned by the RTC server, communicates, by using the WEB-based RTC application, with the terminal sending the call request information.

Preferably, before the step that the first terminal receives call request information that is sent by another terminal to the first terminal and forwarded by an RTC server, the method further includes:

the first terminal sends, to the real time communication RTC server, request information for registering an offline service, where the information carries a unique identifier of a WEB-based RTC application, so that after receiving the request information for registering an offline service, the RTC server enables an offline mode for the WEB-based RTC application corresponding to the unique identifier, and feeds back success response information to the first terminal; and after receiving the success response information fed back by the RTC server, the first terminal closes the WEB-based RTC application.

Preferably, the request information for opening the WEB-based RTC application further carries a type of a WEB-based RTC application selected by a user, so that after receiving the request information for opening the WEB-based RTC application, the RTC server returns a WEB-based RTC application with a same type as the WEB-based RTC application.

Preferably, the call request information further carries identification information of a browser engine of the terminal sending the call request information.

That the first terminal receives call request information sent by the RTC server includes:

after receiving the call request information sent by the RTC server, a monitoring client of the first terminal parses the call request information, determines, according to the identification information of the browser engine in the call request information, that the call request information is information sent to a browser engine, and sends the call request information to a browser engine of the first terminal.

Preferably, the first terminal sends request information for opening the WEB-based RTC application to the RTC server, and after receiving information of the WEB-based RTC application returned by the RTC server, communicates, by using the WEB-based RTC application, with the terminal sending the call request information, which specifically includes:

the first terminal sends the request information for opening the WEB-based RTC application to the RTC server through the browser engine, and after receiving the information of the WEB-based RTC application and SDP Offer information that are returned by the RTC server, generates SDP Answer information according to the SDP Offer information by using the WEB-based RTC application, sends the SDP Answer information to the browser engine by using the WEB-based RTC application, and sends the SDP Answer information to the RTC server through the browser engine, so that the RTC server sends the SDP Answer information to the browser engine of the terminal sending the call request information to establish a communication channel for starting communication;

or, the call request information further carries Session Description Protocol Offer (SDP Offer) information for session negotiation; and the first terminal sends the request information for opening the WEB-based RTC application to the RTC server through the browser engine, and after receiving the information of the WEB-based RTC application returned by the RTC server, sends the SDP Offer information in the call request information to the WEB-based RTC application, generates SDP Answer information according to the SDP Offer information by using the WEB-based RTC application, sends the SDP Answer information to the browser engine by using the WEB-based RTC application, and sends the SDP Answer information to the RTC server through the browser engine, so that the RTC server sends the SDP Answer information to the browser engine of the terminal sending the call request information, so as to establish a communication channel for starting communication;

or, the call request information further carries Session Description Protocol Offer SDP Offer information for session negotiation; and the first terminal sends request information for opening the WEB-based RTC application to the RTC server through the browser engine, where the request information for opening the WEB-based RTC application carries SDP Answer information, so that the RTC server returns the information of the WEB-based RTC application to the first terminal after receiving the request information for opening the WEB-based RTC application, and sends the SDP Answer information in the request information for opening the WEB-based RTC application to the browser engine of the terminal sending the call request information, so as to establish a communication channel; and the first terminal receives the information of the WEB-based RTC application returned by the RTC server, and communicates, by using the WEB-based RTC application, with the terminal sending the call request information.

Preferably, the call request information carries prompt information, where the prompt information is added when the RTC server receives the call request information sent by the another terminal to the first terminal; and after receiving the call request information, the first terminal generates a corresponding prompt, including, but not limited to vibration, ringing or a pop-up prompt box, according to the prompt information in the call request information.

Preferably, this embodiment further includes:

when rejecting the call request, the first terminal feeds rejection information back to the RTC server, so that after receiving the rejection information, the RTC server feeds information back indicating that the first terminal is currently busy or offline to the terminal sending the call request information.

For the specific implementation process of this embodiment, reference may be made to the description of relevant steps in the embodiment corresponding to FIG. 2, and details are not repeatedly described herein.

Figure 4:
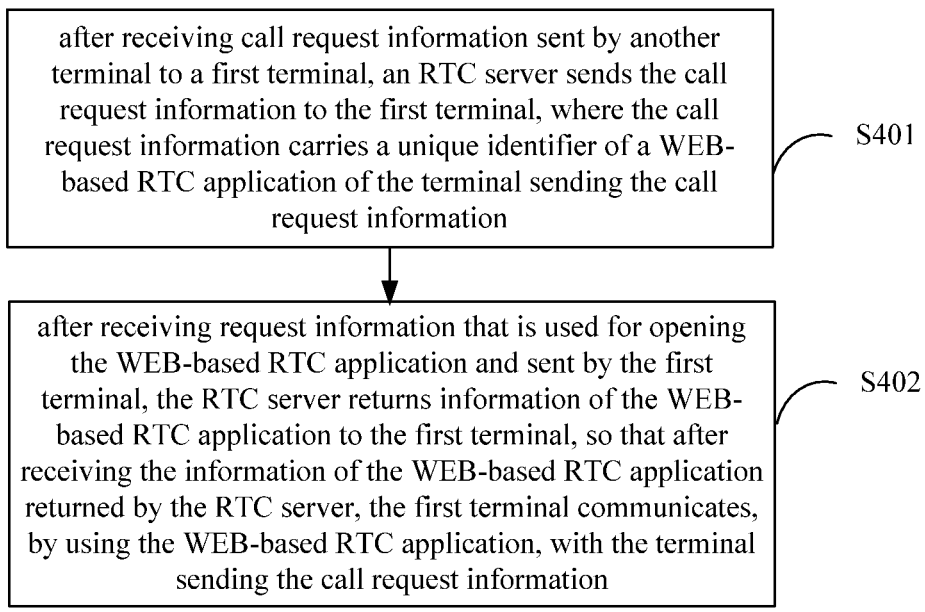
FIG. 4 is an implementation flowchart of a real time communication method according to another embodiment of the present invention.

FIG. 4 illustrates an implementation process of a real time communication method according to another embodiment of the present invention. This embodiment is executed by the RTC server 2 in FIG. 1. The process of the method is described in detail as follows:

In step S401, after receiving call request information sent by another terminal to a first terminal, an RTC server sends the call request information to the first terminal, where the call request information carries a unique identifier of a WEB-based RTC application of the terminal sending the call request information.

In this embodiment, the RTC server sends the call request information to the first terminal that includes:

the RTC server sends the call request information to a monitoring client, so that after receiving the call request information sent by the RTC server, the monitoring client parses the call request information, determines, according to identification information of a browser engine in the call request information, that the call request information is information sent to the browser engine, and sends the call request information to the browser engine of the first terminal.

In step S402, after receiving request information that is used for opening the WEB-based RTC application and sent by the first terminal, the RTC server returns information of the WEB-based RTC application to the first terminal, so that after receiving the information of the WEB-based RTC application returned by the RTC server, the first terminal communicates, by using the WEB-based RTC application, with the terminal sending the call request information.

Preferably, before the step that the RTC server receives call request information sent by another terminal to a first terminal, the method further includes:

after receiving request information for registering an offline service sent by the first terminal, the RTC server enables an offline mode for a WEB-based RTC application corresponding to a unique identifier of the WEB-based RTC application in the information, and sends success response information to the first terminal, so that after receiving the success response information fed back by the RTC server, the first terminal closes the WEB-based RTC application.

Specifically, after receiving the request information for registering an offline service, the RTC server determines, according to the unique identifier of the WEB-based RTC application carried in the request information for registering an offline service, whether the WEB-based RTC application corresponding to the unique identifier has permission to request registration of the offline service, and, if yes, enables the offline mode for the WEB-based RTC application corresponding to the unique identifier.

Preferably, the request information for opening the WEB-based RTC application further carries a type of a WEB-based RTC application selected by a user; and that after receiving request information that is used for opening the WEB-based RTC application and sent by the first terminal, the RTC server returns information of the WEB-based RTC application to the first terminal includes:

after receiving the request information that is used for opening the WEB-based RTC application and sent by the first terminal, the RTC server returns a WEB-based RTC application with a same type as the WEB-based RTC application to the first terminal.

Preferably, this embodiment further includes:

after receiving the call request information sent by the another terminal to the first terminal, the RTC server adds prompt information into the call request information, so that after receiving the call request information, the first terminal generates a corresponding prompt, including vibration, ringing or a pop-up prompt box, according to the prompt information in the call request information.

Preferably, this embodiment further includes:

after receiving rejection of the call request information sent by the first terminal, the RTC server feeds back information indicating that the first terminal is currently busy or offline to the terminal sending the call request information.

Preferably, this embodiment further includes:

after the RTC server sends the call request information to the first terminal, if no information fed back by the first terminal is received within a preset time or received feedback information is not to receive for now, the RTC server caches the call request information, and sends the call request information again after a preset time or after the first terminal opens the WEB-based RTC application.

For the specific implementation process of this embodiment, reference may be made to the description of relevant steps in the embodiment corresponding to FIG. 2, and details are not repeatedly described herein.

Figure 5:
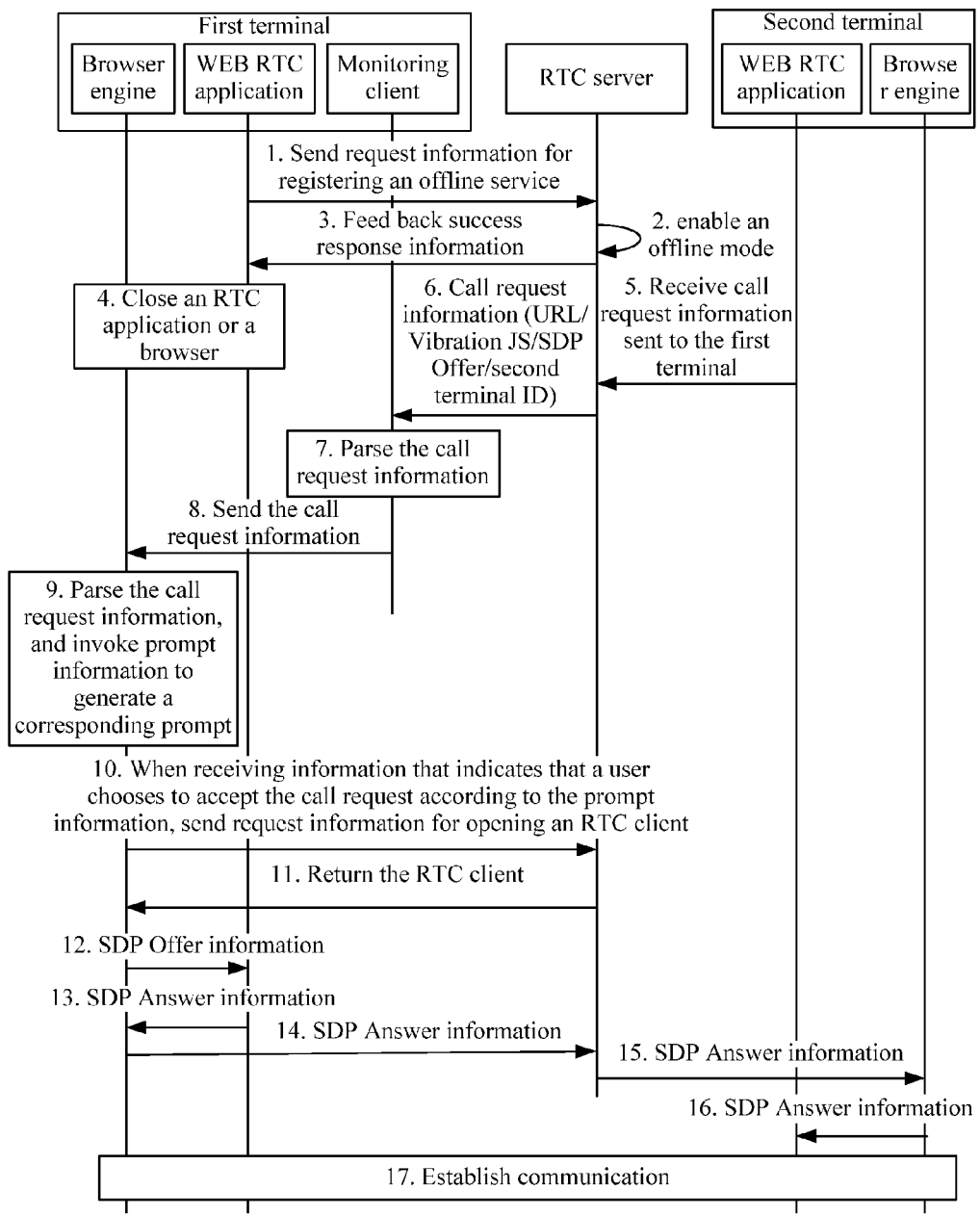
FIG. 5 is a specific flowchart of a real time communication method according to another embodiment of the present invention.

FIG. 5 illustrates a specific process of a real time communication method according to another embodiment of the present invention. The process of the method is described in detail as follows:

1. A first terminal sends, to a real time communication RTC server, request information for registering an offline service, where the information carries a unique identifier of a WEB-based RTC application.

Specifically, the first terminal sends, to the RTC server by using the WEB-based RTC application, the request information for registering an offline service. The WEB-based RTC application includes but is not limited to a client program having a WEB application function, such as WEB QQ.

In this embodiment, a purpose of sending, by the first terminal to the real time communication RTC server, the request information for registering an offline service is to inform the server that the first terminal will close the WEB-based RTC application (including closing the WEB-based RTC application or closing a browser), but hopes that it still can receive call request information or other notification information or the like sent by another terminal to the first terminal after the WEB-based RTC application is closed.

2. After receiving the request information for registering an offline service, the RTC server enables an offline mode for the first terminal.

Preferably, to enhance security and prevent malicious registration, after receiving the request information for registering an offline service, the RTC server determines, according to the unique identifier of the WEB-based RTC application carried in the request information for registering an offline service, whether the WEB-based RTC application corresponding to the unique identifier has permission to request registration of the offline service, and, if yes, enables the offline mode for the WEB-based RTC application corresponding to the unique identifier, so that the RTC server enables the first terminal to stay in an online state, provides notification, and saves call information for the first terminal, and the like.

3. After enabling the offline mode for the first terminal, the RTC server feeds success response information back to the first terminal.

4. After receiving the success response information fed back by the RTC server, the first terminal closes the WEB-based RTC application and/or the browser.

5. The RTC server receives call request information sent by another terminal (a second terminal) to the first terminal.

In this embodiment, the second terminal may be any terminal device having a network access function, including but not limited to a mobile phone, an IPAD, a notebook computer, and the like.

It should be noted that, when the second terminal is a terminal device such as a mobile phone, the call request information needs to be sent to the RTC server after protocol and message conversion is completed by using another gateway.

6. The RTC server sends the call request information to a monitoring client, where the call request information carries a unique identifier of a WEB-based RTC application of the terminal sending the call request information, prompt information, a type of the WEB-based RTC application, information of the browser, address information of the RTC server and/or Session Description Protocol Offer (Session Description Protocol Offer, SDP Offer) information, and the like.

Specifically, the RTC server determines whether the first terminal opens the WEB-based RTC application; if it is determined that the first terminal does not open the WEB-based RTC application, determines whether the offline mode is enabled for the first terminal; and if it is determined that the first terminal enables the offline mode, sends the call request information to the monitoring client.

It should be noted that, the call request information in this embodiment may be sent by using a socket (WEB socket), or may be sent by using at least one of the following: a short message service message, a multimedia message, an HTTP message, the Session Initiation Protocol (Session Initiation Protocol, SIP), and the like.

In addition, the monitoring client in this embodiment may be an independent terminal device, or may be a software and/or hardware unit integrated in the first terminal.

7. After receiving the call request information sent by the RTC server, the monitoring client parses the call request information, determines, according to identification information of a browser engine in the call request information, that the call request information is information sent to a browser engine, and sends the call request information to a browser engine of the first terminal.

8. The monitoring client sends the call request information to the browser engine of the first terminal.

It should be noted that, when the browser is in the closed state, the monitoring client needs to activate the browser engine first, and then sends the call request information to the browser engine for parsing and processing. The monitoring client determines, according to the identification information of the browser engine carried in the call request information, that the call request information is information sent to the browser engine, and activates the browser engine.

9. The browser engine receives and parses the call request information, and invokes prompt information in the call request information to generate a corresponding prompt, including but not limited to vibration, ringing or a pop-up prompt box.

For example, when the prompt information is vibration, the browser engine parses the prompt information, and invokes a vibration application programming interface API to complete a vibration prompt, for example, navigator.vibrate ([1000, 500, 2000]), indicating vibration of 1 second and pause of 0.5 second, and a total vibration duration is 2 seconds. For another example, when the prompt information is a pop-up prompt box, an interactive API interface is invoked, for example, the prompt box pops up in an Alert manner: Alert("second terminal", www.WEBqq.com, "opera mini", "whether to answer a call").

10. When receiving information that indicates that a user chooses to accept the call request according to the prompt information, the first terminal sends request information for opening the WEB-based RTC application to the RTC server through the browser engine.

11. After receiving the call request information, the RTC server returns a corresponding WEB-based RTC application.

12. The browser engine sends the SDP Offer information in the call request information to the WEB-based RTC application.

13. The WEB-based RTC application generates SDP Answer information according to the SDP Offer information, and sends the SDP Answer information to the browser engine.

14. The browser engine sends the SDP Answer information to the RTC server.

15. The RTC server sends the SDP Answer information to a browser engine of the terminal sending the call request information (the second terminal).

16. The browser engine of the second terminal sends the SDP Answer information to the WEB-based RTC application of the second terminal.

17. The first terminal and the second terminal establish communication.

Preferably, in step 6 of this embodiment, the SDP Offer information may not be carried; instead, the SDP Offer information is carried when the corresponding WEB-based RTC application is returned in step 11, and the WEB-based RTC application directly generates the SDP Answer information according to the SDP Offer information.

Preferably, to further enhance user experience, this embodiment further includes:

when receiving information that indicates that the user chooses to reject the call request, the first terminal feeds back rejection information to the RTC server; and after receiving the rejection information, the RTC server feeds back information indicating that the first terminal is currently busy or offline, or the like information to the terminal sending the call request information.

Preferably, the request information for opening the WEB-based RTC application further carries a type of a WEB-based RTC application selected by the user, so that after receiving the request information for opening the WEB-based RTC application, the RTC server returns a WEB-based RTC application with a same type as the WEB-based RTC application selected by the user. The type of the WEB-based RTC application may be the same as or different from the type of the WEB-based RTC application in the call request information.

Preferably, after the RTC server sends the call request information to the first terminal, if no information fed back by the first terminal is received within a preset time or received feedback information is not to receive for now, the RTC server caches the call request information, and sends the call request information again after a preset time or after the first terminal opens the WEB-based RTC application. The RTC server may further generate prompt information, and store the information for the user for query by the first terminal, or actively send the information to the first terminal. The prompt information may be text information or information of a multimedia type, such as audio and video. The prompt information may prompt the user of information, such as a sender of sending a call, call time, a type of the used WEB-based RTC application, and a type of a browser. When the user logs in to the WEB-based RTC application or opens the browser next time, a notification message of a missed call or a message may be received.

Figure 6:
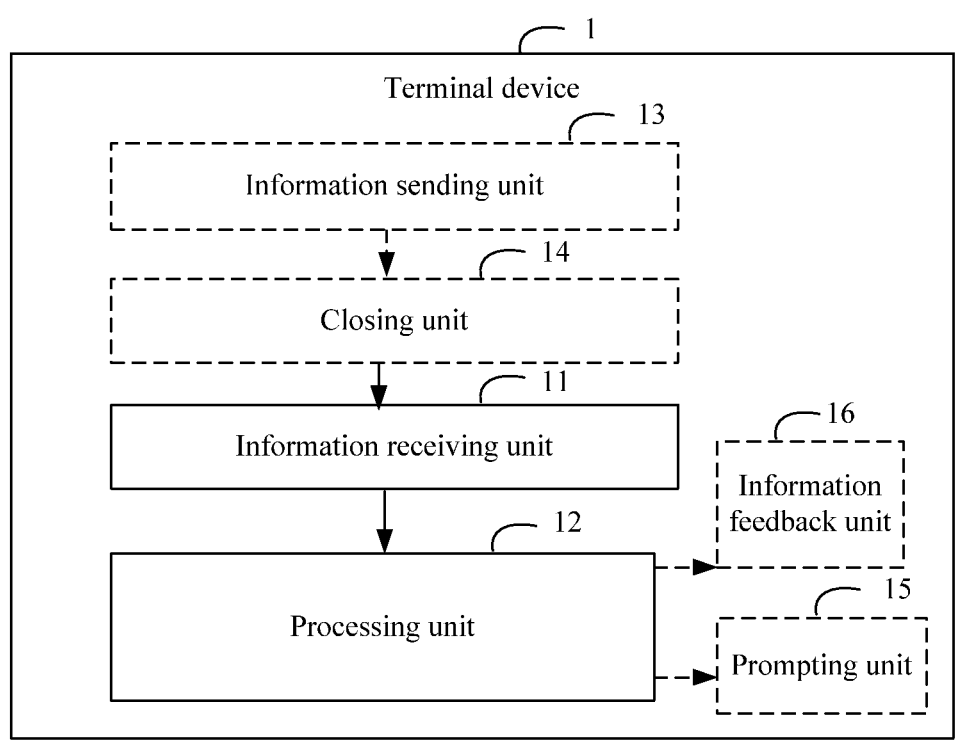
FIG. 6 is a constitution structural diagram of a terminal device according to another embodiment of the present invention.

FIG. 6 illustrates a composition structure of a terminal device according to another embodiment of the present invention. For ease of description, only a part related to this embodiment of the present invention is shown.

The terminal device 1 includes an information receiving unit 11 and a processing unit 12. Specific functions of each unit are as follows:

The information receiving unit 11 is configured to receive call request information that is sent by another terminal to the terminal device 1 and forwarded by an RTC server, where the call request information carries a unique identifier of a WEB-based RTC application of the terminal sending the call request information.

The processing unit 12 is configured to determine, according to the unique identifier of the WEB-based RTC application of the terminal sending the call request information, whether to accept a call request, where the unique identifier is carried in the call request information received by the information receiving unit 11; if it is determined that the call request needs to be accepted, send request information for opening the WEB-based RTC application to the RTC server; and after receiving information of the WEB-based RTC application returned by the RTC server, communicate, by using the WEB-based RTC application, with the terminal sending the call request information.

Further, the terminal device 1 further includes:

an information sending unit 13, configured to send, to the real time communication RTC server, request information for registering an offline service, where the information carries a unique identifier of a WEB-based RTC application, so that after receiving the request information for registering an offline service, the RTC server enables an offline mode for the WEB-based RTC application corresponding to the unique identifier, and feeds back success response information to the first terminal; and a closing unit 14, configured to close the WEB-based RTC application after the success response information fed back by the RTC server is received.

Preferably, the request information for opening the WEB-based RTC application further carries a type of a WEB-based RTC application selected by a user, so that after receiving the request information for opening the WEB-based RTC application, the RTC server returns a WEB-based RTC application with a same type as the WEB-based RTC application.

Further, the call request information further carries identification information of a browser engine of the terminal sending the call request information; and the information receiving unit 11 is specifically configured to receive, through a monitoring client of the terminal device 1, the call request information sent by the RTC server, parse the call request information, determine, according to the identification information of the browser engine in the call request information, that the call request information is information sent to a browser engine, and send the call request information to a browser engine of the first terminal.

Preferably, the call request information further carries Session Description Protocol Offer SDP Offer information for session negotiation; and the processing unit 12 is specifically configured to send request information for opening the WEB-based RTC application to the RTC server through the browser engine of the terminal device 1, and after receiving the information of the WEB-based RTC application returned by the RTC server, send the SDP Offer information in the call request information to the WEB-based RTC application, generate SDP Answer information according to the SDP Offer information by using the WEB-based RTC application, send the SDP Answer information to the browser engine by using the WEB-based RTC application, and send the SDP Answer information to the RTC server through the browser engine, so that the RTC server sends the SDP Answer information to the browser engine of the terminal sending the call request information, so as to establish a communication channel for starting communication.

Alternatively, the processing unit 12 is specifically configured to send request information for opening the WEB-based RTC application to the RTC server through the browser engine of the terminal device 1, where the request information for opening the WEB-based RTC application carries SDP Answer information, so that the RTC server returns the information of the WEB-based RTC application to the first terminal after receiving the request information for opening the WEB-based RTC application, and sends the SDP Answer information in the request information for opening the WEB-based RTC application to the browser engine of the terminal sending the call request information, so as to establish a communication channel; and after receiving the information of the WEB-based RTC application returned by the RTC server, communicate, by using the WEB-based RTC application, with the terminal sending the call request information.

Alternatively, the processing 12 is specifically configured to send request information for opening the WEB-based RTC application to the RTC server through the browser engine of the terminal device 1, and after receiving the information of the WEB-based RTC application and SDP Offer information that are returned by the RTC server, generate SDP Answer information according to the SDP Offer information by using the WEB-based RTC application, send the SDP Answer information to the browser engine by using the WEB-based RTC application, and send the SDP Answer information to the RTC server through the browser engine, so that the RTC server sends the SDP Answer information to the browser engine of the terminal sending the call request information to establish a communication channel for starting communication.

Preferably, the call request information carries prompt information, where the prompt information is added when the RTC server receives the call request information sent by another terminal to the first terminal.

The terminal device 1 further includes:

a prompting unit 15, configured to generate a corresponding prompt according to the prompt information in the call request information after the call request information is received, where the corresponding prompt includes but is not limited to vibration, ringing or a pop-up prompt box.

Further, the terminal device 1 further includes:

an information feedback unit 16, configured to, when the call request is rejected, feed rejection information back to the RTC server, so that after receiving the rejection information, the RTC server feeds back information indicating that the first terminal is currently busy or offline to the terminal sending the call request information.

The terminal device 1 provided in this embodiment may use the corresponding real time communication methods. For details, refer to the relevant descriptions of the embodiments of the real time communication methods corresponding to FIG. 2, FIG. 3 and FIG. 5, and details are not repeatedly described herein.

Figure 7:
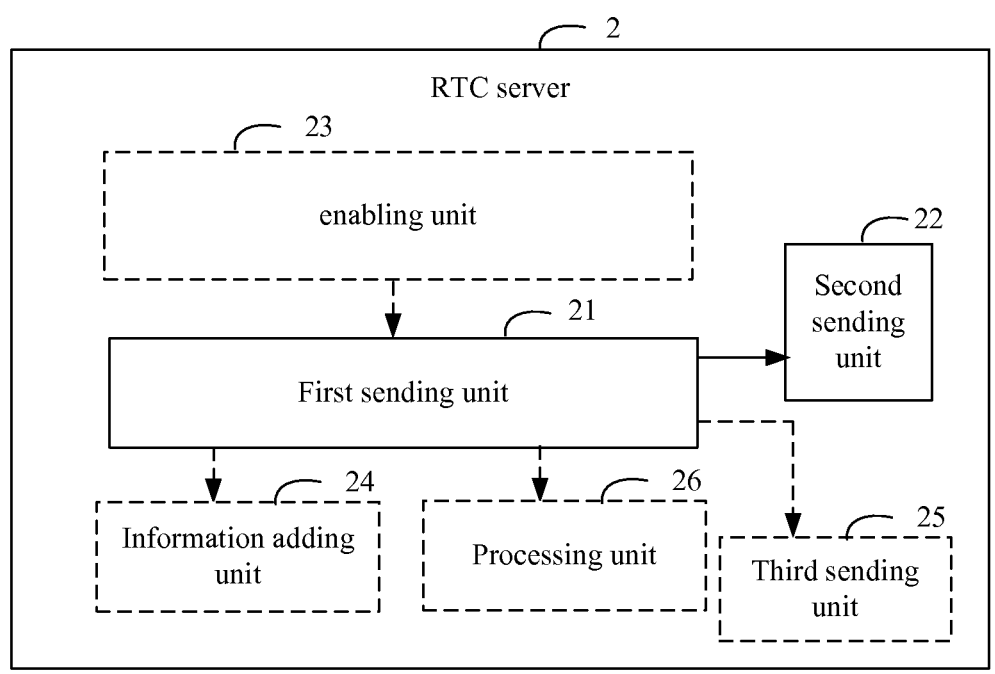
FIG. 7 is a constitution structural diagram of an RTC server according to another embodiment of the present invention.

FIG. 7 illustrates a composition structure of an RTC server according to another embodiment of the present invention. For ease of description, only a part related to this embodiment of the present invention is shown.

The RTC server 2 includes a first sending unit 21 and a second sending unit 22. Specific functions of each unit are as follows:

The first sending unit 21 is configured to, after call request information sent by another terminal to a first terminal is received, send the call request information to the first terminal, where the call request information carries a unique identifier of a WEB-based RTC application of the terminal sending the call request information.

The second sending unit 22 is configured to, after request information that is used for opening the WEB-based RTC application and sent by the first terminal is received, return information of the WEB-based RTC application to the first terminal, so that after receiving the information of the WEB-based RTC application returned by the RTC server 2, the first terminal communicates, by using the WEB-based RTC application, with the terminal sending the call request information.

Further, the RTC server 2 further includes:

an enabling unit 23, configured to, after request information for registering an offline service sent by the first terminal is received, enable an offline mode for a WEB-based RTC application corresponding to a unique identifier of the WEB-based RTC application in the information, and feed success response information back to the first terminal, so that after receiving the success response information fed back by the RTC server 2, the first terminal closes the WEB-based RTC application.

The enabling unit 23 is specifically configured to, after the request information for registering an offline service is received, determine, according to the unique identifier of the WEB-based RTC application carried in the request information for registering an offline service, whether the WEB-based RTC application corresponding to the unique identifier has permission to request registration of the offline service, and if yes, enable the offline mode for the WEB-based RTC application corresponding to the unique identifier.

Preferably, the request information for opening the WEB-based RTC application further carries a type of a WEB-based RTC application selected by a user.

The second sending unit 22 is specifically configured to return a WEB-based RTC application with a same type as the WEB-based RTC application to the first terminal after the request information that is used for opening the WEB-based RTC application and sent by the first terminal is received.

Further, the RTC server 2 further includes:

an information adding unit 24, configured to add prompt information into the call request information after the call request information sent by the another terminal to the first terminal is received, so that after receiving the call request information, the first terminal generates a corresponding prompt according to the prompt information in the call request information, where the corresponding prompt includes vibration, ringing or a pop-up prompt box.

Further, the second sending unit 22 is configured to send the call request information to a monitoring client, so that after receiving the call request information sent by the RTC server 2, the monitoring client parses the call request information, determines, according to identification information of a browser engine in the call request information, that the call request information is information sent to a browser engine, and sends the call request information to a browser engine of the first terminal.

Further, the RTC server 2 further includes:

a third sending unit 25, configured to, after receiving rejection of the call request information sent by the first terminal, feed information indicating that the first terminal is currently busy or offline back to the terminal sending the call request information.

Further, the RTC server 2 further includes:

a processing unit 26, configured to, after the call request information is sent to the first terminal, if no information fed back by the first terminal is received within a preset time or received feed back information is not to receive for now, cache the call request information, and send the call request information again after a preset time or after the first terminal opens the WEB-based RTC application.

The RTC server 2 provided in this embodiment may use the corresponding real time communication methods. For details, refer to the relevant descriptions of the embodiments of the real time communication methods corresponding to FIG. 2, FIG. 4 and FIG. 5, and details are not repeatedly described herein.

A person of ordinary skill in the art can understand that all units included in the embodiment of the terminal device 1 and the embodiment of the RTC server 2 are only divided according to functional logic, but are not limited to the above division as long as corresponding functions can be implemented. In addition, specific names of all functional units are for differentiation only, but are not intended to limit the protection scope of the embodiments of the present invention.

In addition, functional units in each embodiment among the embodiments of the present invention may be integrated into one processing unit, or each of the units may exist alone physically, or two or more units are integrated into one unit. The integrated unit may be implemented in a form of hardware, or may be implemented in a form of a software functional unit.

When being implemented in the form of a software functional unit and sold or used as an independent product, the integrated unit may be stored in a computer-readable storage medium. Based on such an understanding, the technical solutions in the embodiments of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor (processor) to perform all or a part of the steps of the methods described in each embodiment among the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

In conclusion, in the embodiments of the present invention, an offline mode is enabled by sending, to an RTC server, request information for registering an offline service, so that in a case in which a WEB-based RTC application of a terminal is closed, the terminal can still receive call request information that is sent by another terminal to the terminal and forwarded by the RTC server, and after receiving the call request information, sends request information for opening the WEB-based RTC application to the RTC server, and after receiving the WEB-based RTC application returned by the RTC server, communicates, by using the WEB-based RTC application, with the terminal sending the call request information. In the embodiments of the present invention, the following problem can be effectively solved: In existing WEB-based real time communication, information cannot be acquired when two parties in communication are not simultaneously online or the WEB-based RTC application is not opened. In addition, a browser and/or the WEB-based RTC application is closed, which can save battery power and save network resources for keeping a single connection to a network, sending a heartbeat message, and the like. Meanwhile, messages are monitored, which can also achieve a technical effect of signaling negotiation and improve signaling negotiation efficiency when no session is established. In addition, a call can further be accepted selectively according to a unique identifier of a WEB-based RTC application of the terminal sending the call request information, which improves user experience and achieves high practicability.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method, comprising:
    receiving, by a first terminal from a real time communication (RTC) server, call request information a second terminal making a call request to the first terminal, wherein the call request is for the first terminal to initiate a WEB-based RTC session with the second terminal through a WEB-based RTC application, wherein the call request information is received by the first terminal outside the WEB-based RTC application, and wherein the call request information carries a second identifier of the WEB-based RTC application that is unique to the second terminal;
    determining, by the first terminal, according to the second identifier, whether to accept the call request; and
    initiating, by the first terminal, when accepting the call request, the WEB-based RTC session with the second terminal through the WEB-based RTC application;
    wherein initiating the WEB-based RTC session comprises:
        sending, by the first terminal to the RTC server, request information for the RTC server to open the WEB-based RTC application with the first terminal;
        receiving, by the first terminal, information of the WEB-based RTC application from the RTC server in response to the request information sent by the first terminal to the RTC server; and
        establishing, by the first terminal, the WEB-based RTC session with the second terminal, through the WEB-based RTC application.

2. The method according to claim 1, wherein the method further comprises performing, before the receiving the call request information:
    sending, by the first terminal, to the RTC server, offline request information for registering an offline service for the WEB-based RTC application, wherein the offline request information carries a first identifier of the WEB-based RTC application that is unique to the first terminal, wherein the RTC server enables an offline mode for the first terminal in the WEB-based RTC application corresponding to the first identifier;
    receiving, by the first terminal, success response information from the RTC server, the success response information indicative of enablement of the offline mode for the first terminal in the WEB-based RTC application; and
    closing, by the first terminal, the WEB-based RTC application after receiving the success response information.

3. The method according to claim 1, wherein the call request information further carries an identification of a second type of the WEB-based RTC application selected by a user at the second terminal; and
    wherein the receiving, by the first terminal, information of the WEB-based RTC application from the RTC server in response to the request information sent by the first terminal comprises receiving, by the first terminal, information of the second type of the WEB-based RTC application selected by the user from the RTC server in response to the request information sent by the first terminal; and wherein the establishing, by the first terminal, the WEB-based RTC session with the second terminal, through the WEB-based RTC application comprises establishing, by the first terminal, the WEB-based RTC session with the second terminal through a first type of the WEB-based RTC application in the first terminal, wherein the first type is the same as the second type of the WEB-based RTC application.

4. The method according to claim 1, wherein the call request information further carries identification information of a browser engine of the second terminal; and wherein the receiving, by the first terminal, the call request information comprises:
  receiving, by a monitoring client of the first terminal, the call request information from the RTC server;
  parsing, by the monitoring client, the call request information;
  determining, by the monitoring client, according to the identification information of the browser engine in the call request information, that the call request information is sent by the second terminal to the browser engine; and
  sending, by the monitoring client, the call request information to a browser engine of the first terminal.

5. The method according to claim 4, wherein the call request information further carries Session Description Protocol (SDP) Offer information for session negotiation; and wherein the sending, by the first terminal to the RTC server, the request information to open the WEB-based RTC application comprises sending, by the first terminal to the RTC server, the request information for opening the WEB-based RTC application through the browser engine of the first terminal; and wherein the establishing, by the first terminal, the WEB-based RTC session with the second terminal comprises:
  sending, by the first terminal, the SDP Offer information in the call request information through the browser engine to the WEB-based RTC application in the first terminal;
  generating, by the first terminal, SDP Answer information according to the SDP Offer information in the WEB-based RTC application in the first terminal;
  sending, by the first terminal, the SDP Answer information to the browser engine of the first terminal, through the WEB-based RTC application; and
  sending, by the first terminal, the SDP Answer information to the RTC server through the browser engine, wherein the RTC server forwards the SDP Answer information of the first terminal to the browser engine of the second terminal.

6. The method according to claim 1, wherein the call request information further carries Session Description Protocol (SDP) Offer information for session negotiation; and wherein establishing, by the first terminal, the WEB-based RTC session with the second terminal, comprises conducting, by the first terminal, session negotiation with the second terminal, through the RTC server, between a browser engine of the first terminal and a browser engine of the second terminal, of the SDP Offer information originating from the second terminal, and SDP Answer information generated by the first terminal.

7. The method according to claim 4, wherein the sending, by the first terminal, the request information to open the WEB-based RTC application comprises sending, by the first terminal through the browser engine, the request information to open the WEB-based RTC application to the RTC server; and wherein the establishing, by the first terminal, the WEB-based RTC session with the second terminal comprises:
  generating, by the first terminal, Session Description Protocol (SDP) Answer information according to SDP Offer information, in the WEB-based RTC application;
  sending, by the first terminal, the SDP Answer information to the browser engine through the WEB-based RTC application; and
  sending, by the first terminal, the SDP Answer information to the RTC server through the browser engine, wherein the RTC server forwards the SDP Answer information of the first terminal to the browser engine of the second terminal.

8. A method, comprising:
sending, by a real time communication (RTC) server to a first terminal, call request information that a second terminal sent to the RTC server for a call request to the first terminal, wherein the call request is for the first terminal to initiate a WEB-based RTC session with the second terminal through a WEB-based RTC application, wherein the call request information is received by the first terminal outside the WEB-based RTC application, and wherein the call request information carries a second identifier of the WEB-based RTC application unique to the second terminal;
receiving, by the RTC server, request information sent by the first terminal indicating that the first terminal accepts the call request based on the second identifier; and
returning, by the RTC server, information of the WEB-based RTC application to the first terminal after receiving the request information sent by the first terminal;
wherein the first terminal, based on the information of the WEB-based RTC application returned by the RTC server, opens the WEB-based RTC application and establishes the WEB-based RTC session with the second terminal through the WEB-based RTC application.

9. The method according to claim 8, wherein the method further comprises performing, before the sending the call request information:
  receiving, by the RTC server, from the first terminal, offline request information for registering an offline service for the WEB-based RTC application, wherein the offline request information carries a first identifier of the WEB-based RTC application that is unique to the first terminal;
  enabling, by the RTC server, an offline mode for the first terminal in the WEB-based RTC application corresponding to the first identifier of the WEB-based RTC application; and
  feeding back, by the RTC server, success response information to the first terminal, indicative to the first terminal that the offline mode is enabled and that the WEB-based RTC application can be closed.

10. The method according to claim 9, wherein the enabling the offline mode comprises:
  determining, by the RTC server, according to the first identifier of the WEB-based RTC application, whether the WEB-based RTC application has permission to request registration of the offline service for the first terminal; and
  enabling, by the RTC server, the offline mode for the WEB-based RTC application corresponding to the first identifier responsive to determining that the WEB-based RTC application has permission to request registration of the offline service for the first terminal.

11. A terminal device, comprising:
  a transceiver configured to receive, from a real time communication (RTC) server, call request information of another terminal making a call request to the terminal device, wherein the call request is for the terminal device to initiate a WEB-based RTC session with the other terminal through a WEB-based RTC application, wherein the call request information is received by the transceiver from the RTC server outside the WEB-based RTC application, and wherein the call request information carries a second identifier of a WEB-based RTC application unique to the other terminal; and
  a processor configured to:
    determine, according to the second identifier, whether to accept the call request; and
    initiate, when accepting the call request, the WEB-based RTC session with the terminal device through the WEB-based RTC application, by being configured with the transceiver to:
      send request information to the RTC server for opening the WEB-based RTC application with the terminal device;
      receive information of the WEB-based RTC application from the RTC server in response to the request information sent to the RTC server for opening the WEB-based RTC application in the terminal device; and
      establish the WEB-based RTC session with the other terminal through the WEB-based RTC application.

12. The terminal device according to claim 11, wherein the transceiver is further configured to:
  send, to the RTC server, offline request information for registering an offline service for the terminal device, wherein the offline request information carries a first identifier of the WEB-based RTC application unique to the terminal device, wherein the RTC server is configured to enable an offline mode for the WEB-based RTC application for the terminal device in the WEB-based RTC application corresponding to the first identifier; and
  receive success response information from the RTC server, the success response information indicative of enablement of the offline mode for the terminal device; and
  wherein the processor is further configured to close the WEB-based RTC application in the terminal device, after the transceiver receives the success response information from the RTC server.

13. The terminal device according to claim 11, wherein the call request information further carries an identification of a second type of the WEB-based RTC application selected by a user at the other terminal; and
  wherein the processor is further configured with the transceiver to receive information of the WEB-based RTC application from the RTC server, by being configured with the transceiver to receive information of the second type of the WEB-based RTC application from the RTC server in response to the request information sent by the terminal device; and
  wherein the processor is further configured to establish the WEB-based RTC session with the other terminal through the WEB-based RTC application by being configured to establish the WEB-based RTC session with the other terminal through a first type of the WEB-based RTC application in the terminal device, wherein the first type is the same as the second type of the WEB-based RTC application.

14. The terminal device according to claim 11, wherein the call request information further carries identification information of a browser engine of the other terminal; and
  wherein the transceiver is further configured to:
    receive, by a monitoring client of the terminal device, the call request information sent by the RTC server;
    parse, by the monitoring client, the call request information;
    determine, by the monitoring client, according to the identification information of the browser engine in the call request information, that the call request information is sent by the other terminal to the browser engine; and
    send, by the monitoring client, the call request information to a browser engine of the terminal device.

15. The terminal device according to claim 14, wherein:
  the call request information further carries Session Description Protocol (SDP) Offer information for session negotiation;
  the transceiver is configured to send the request information for opening the WEB-based RTC application in the terminal device, to the RTC server, through the browser engine of the terminal device; and
  the processor is configured with the transceiver to establish the WEB-based RTC session with the other terminal through the WEB-based RTC application by being configured with the transceiver to:
    send the SDP Offer information in the call request information through the browser engine to the WEB-based RTC application;
    generate SDP Answer information according to the SDP Offer information in the WEB-based RTC application;
    send the SDP Answer information to the browser engine through the WEB-based RTC application; and
    send the SDP Answer information to the RTC server through the browser engine, wherein the RTC server is configured to forward the SDP Answer information to the browser engine of the other terminal.

16. The terminal device according to claim 11, wherein the call request information further carries Session Description Protocol (SDP) Offer information for session negotiation; and
  wherein the processor is configured with the transceiver to establish the WEB-based RTC session with the other terminal through the WEB-based RTC application by being configured to conduct session negotiation with the other terminal, through a browser engine of the terminal device with the RTC server and with a browser engine of the other terminal, of the SDP Offer information originating from the other terminal, and SDP Answer information generated by the terminal device.

17. The terminal device according to claim 14, wherein the transceiver is configured to send the request information for opening the WEB-based RTC application in the terminal device, to the RTC server, through the browser engine of the terminal device; and wherein the processor is configured with the transceiver to establish the WEB-based RTC session with the other terminal through the WEB-based RTC application by being configured with the transceiver to:
generate SDP Answer information according to the SDP Offer information, in the WEB-based RTC application;
send the SDP Answer information to the browser engine through the WEB-based RTC application; and
send the SDP Answer information to the RTC server through the browser engine, wherein the RTC server forwards the SDP Answer information of the terminal device to the browser engine of the other terminal.

18. A server, comprising:
a transceiver configured to:
receive call request information from a second terminal making a call request to a first terminal, wherein the call request is for the first terminal to initiate a WEB-based real time communication (RTC) session with the second terminal through a WEB-based RTC application;
send the call request information to the first terminal, to be received by the first terminal outside the WEB-based RTC application, wherein the call request information carries a second identifier of a WEB-based RTC application unique to the second terminal;
receive request information sent by the first terminal indicating that the first terminal accepts the call request based on the second identifier; and
return information of the WEB-based RTC application to the first terminal, so that after receiving the request information from the first terminal;

wherein the first terminal, based on the information of the WEB-based RTC application returned by the server, opens the WEB-based RTC application and establishes the WEB-based RTC session with the second terminal through the WEB-based RTC application.

19. The server according to claim 18 further comprising:
a processor coupled to the transceiver, wherein the processor is configured with the transceiver to;
receive, before the transceiver sends the call request information to the first terminal, offline request information, from the first terminal for registering an offline service for the WEB-based RTC application, wherein the offline request information carries a first identifier of the WEB-based RTC application that is unique to the first terminal;
wherein the processor is configured, with the transceiver, to:
enable an offline mode for the first terminal in the WEB-based RTC application; and
feed back success response information to the first terminal, indicative to the first terminal that the offline mode is enabled and that the WEB-based RTC application can be closed.

20. The server according to claim 19, wherein the processor is configured with the transceiver to enable the offline mode for the WEB-based RTC application in the first terminal, by being configured with the transceiver to:
determine, according to the first identifier of the WEB-based RTC application, whether the WEB-based RTC application has permission to request registration of the offline service for the first terminal; and
enable the offline mode for the WEB-based RTC application corresponding to the first identifier responsive to determining that the WEB-based RTC application has permission to request registration of the offline service for the first terminal.

* * * * *

UNITED STATES PATENT AND TRADEMARK OFFICE
CERTIFICATE OF CORRECTION

PATENT NO. : 9,854,008 B2
APPLICATION NO. : 14/576037
DATED : December 26, 2017
INVENTOR(S) : Shunan Fan Page 1 of 1

It is certified that error appears in the above-identified patent and that said Letters Patent is hereby corrected as shown below:

In the Claims

In Column 30, Line 17-18, Claim 1, delete "call request information a second terminal" and insert --call request information of a second terminal--.

Signed and Sealed this
Twelfth Day of June, 2018

Andrei Iancu
*Director of the United States Patent and Trademark Office*